(No Model.)
T. ROSEKRANS.
HARNESS.
No. 424,225. Patented Mar. 25, 1890.
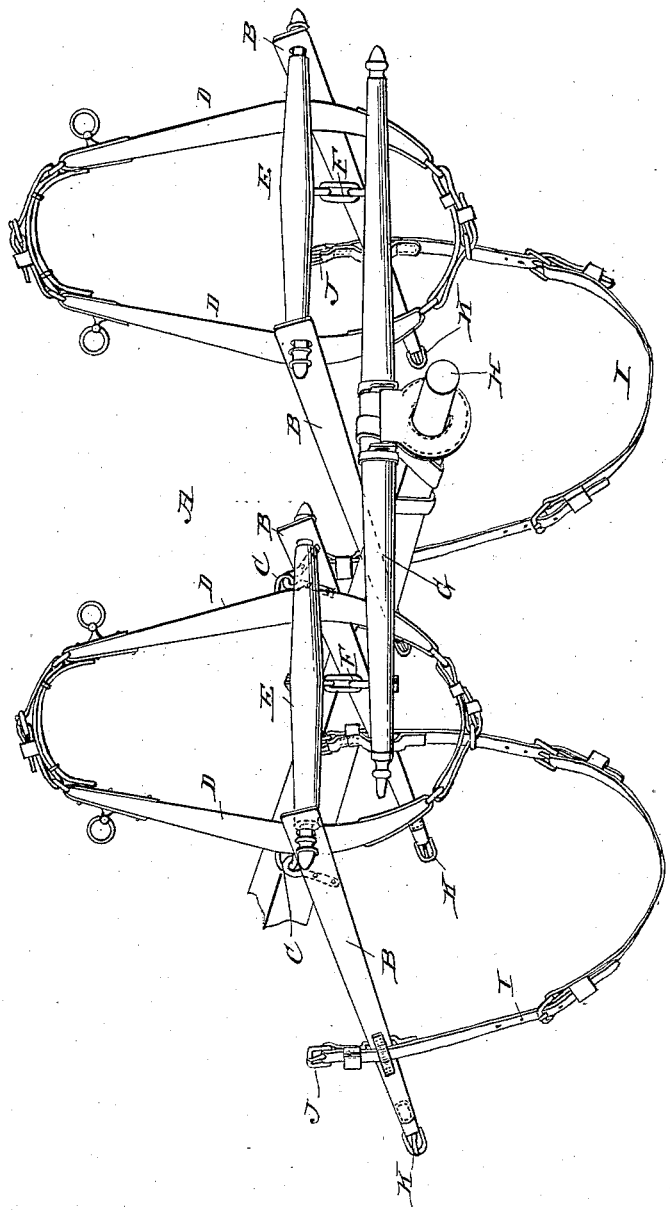
WITNESSES:
INVENTOR:
T. Rosekrans
BY Munn & Co.
ATTORNEYS.

UNITED STATES PATENT OFFICE.

THOMAS ROSEKRANS, OF ESOPUS, NEW YORK.

HARNESS.

SPECIFICATION forming part of Letters Patent No. 424,225, dated March 25, 1890.

Application filed October 10, 1889. Serial No. 326,566. (No model.)

*To all whom it may concern:*

Be it known that I, THOMAS ROSEKRANS, of Esopus, in the county of Ulster and State of New York, have invented a new and Improved Harness, of which the following is a full, clear, and exact description.

The object of the invention is to provide a new and improved harness which is simple and durable in construction and permits the animal to work with great freedom and ease.

The invention consists in certain parts and details and combinations of the same, as will be hereinafter described, and then pointed out in the claims.

Reference is to be had to the accompanying drawing, forming a part of this specification, in which the figure represents a perspective view of the improvement as adapted for a team.

The improved harness may be used single or double for a team, as represented in the drawing.

The improved harness A is provided with a pair of traces B, made rigid, preferably of wood, iron, or other suitable material, and pivotally connected by suitable means C to the pair of hames D. The traces B extend a short distance in front of the hames D, and the front projecting ends are connected with each other by a rigid neck-yoke E, coupled by links F or other devices in the middle, with one end of the pole-yoke G fastened in the usual manner on the outer end of the pole H. The traces B extend rearward from the hames D for about two feet, and are connected with each other at or near the rear ends by the belly-band I, provided on its upper ends with buckles J, which connect with a saddle-band. At the extreme rear ends of the traces B are secured the buckles K, which connect the traces with the breeching, if desired.

When the harness is placed on the animal, the short neck-yoke E extends in front of the breast of the animal, so that in moving forward it exerts, by means of the rigid traces B, a pressure on the yoke E, so that the latter, being connected with the pole-yoke G fastened on the pole H, pulls said pole forward and consequently the wagon held on the rear end of the pole. It will be seen that the rigid traces B naturally swing upward at their rear ends when the animal is shoving; but the upward movement of the traces is limited by the belly-band I. If desired, the rear ends of the traces may be connected by the buckles K with the breeching, and the breeching of the two horses may be connected with each other by a strap to prevent an outward swinging of the horses. It will further be seen that by this device the animal is not burdened with the numerous straps, &c., now found in harnesses as used, so that the animal can work with great ease when moving the wagon forward. It will also be seen that the power of the animal is applied in front of the same in pulling the wagon.

Having thus described my invention, what I claim as new, and desire to secure by Letters Patent, is—

1. In a harness, a pair of rigid traces, a neck-yoke connecting the front ends of said traces, hames connected by staples or loops to said braces in rear of said yoke, the traces being of a length to extend along the sides of a horse, substantially as set forth.

2. A harness comprising a pair of rigid traces adapted to be held on the hames and projecting in front of the same, a short neck-yoke connecting the ends of the traces with each other, and a belly-band connecting the rear ends of the said rigid traces with each other, substantially as shown and described.

3. A harness comprising a pair of rigid traces adapted to be held on the hames and projecting in front of the same, a short neck-yoke connecting the ends of the traces with each other, and buckles held on the rear ends of the said rigid traces, substantially as shown and described.

THOMAS ROSEKRANS.

Witnesses:
CHAS. W. DEYO,
D. E. KEYSER.